Patented Oct. 13, 1931

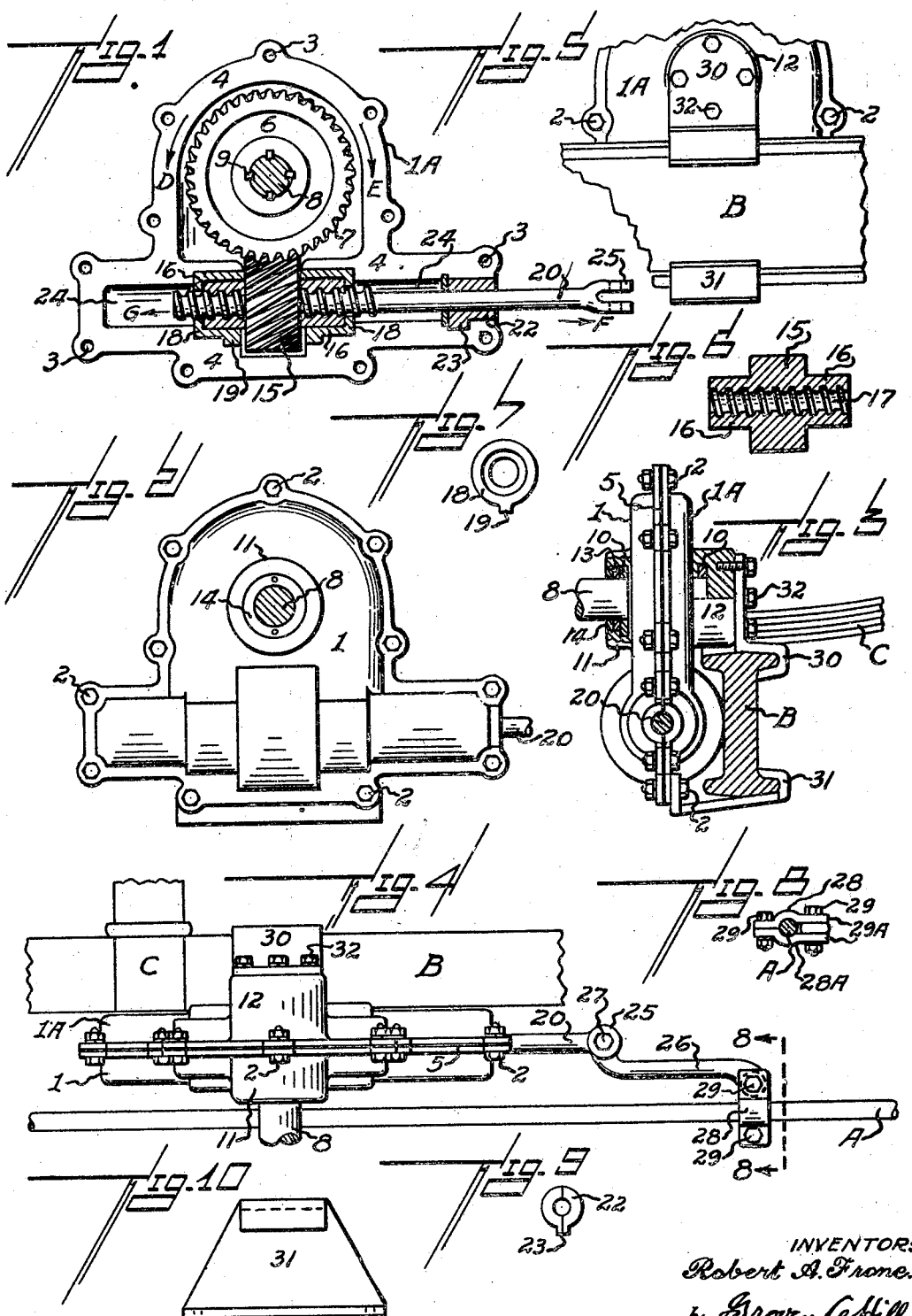

1,827,428

UNITED STATES PATENT OFFICE

ROBERT A. FRONE, OF DETROIT, MICHIGAN

STEERING DEVICE FOR AUTOMOBILES

Application filed June 9, 1930. Serial No. 459,998.

This invention relates to improvements in the steering apparatus of an automobile, and provides a device of this character which presents a distinctively new type of construction, whereby a decidedly more positive control of the front wheels of the vehicle is effected, and particularly adding a far greater safety than any system as heretofore devised for this purpose.

In the use of the worm type of construction for the steering unit, it is readily understood that vibration or the loss of control of the front wheels is entirely eliminated, thus preventing the result of this commonly known menace found in almost every type of automobile of the present time, and while the invention embodies many other advantages it seeks to overcome this difficulty as a major object.

The invention possesses numerous further advantages, all of which will be clearly revealed during the course of the detailed description to follow, within the accompanying drawings, and more particularly pointed out in the appended claims.

With reference to the drawings:

Figure 1 is a sectional view of the complete assembly, with one half of the housing therefor removed.

Figure 2 is an elevation of the complete device, with shaft broken as indicated.

Figure 3 is an end elevation with portions broken away exposing certain inner portions, also showing how the device is connected to the front axle of the vehicle.

Figure 4 is a top plan view of the complete device, and clearly indicating how the same is connected to the tie rod of the automobile.

Figure 5 is a front elevation of the brackets for securing the device to the axle, and showing a partial view of the latter.

Figure 6 is a longitudinal section of the driven gear, and indicating the spiral threads through the center of the same.

Figure 7 is an end elevation of one of the bushings in which the laterally extending portions of the driven gear are journaled.

Figure 8 is a sectional view taken substantially upon line 8—8, of Figure 4.

Figure 9 is an end elevation of the split bushing of the device.

Figure 10 is a top plan view of the lower supporting bracket of the device.

The invention comprises a complete housing which consists of half members indicated by the numeral 1, preferably of a suitable cast metal, and the said members being identical in formation except for a slight difference of an extended boss upon one of them.

With reference to Figures 1 and 2 it is seen that members 1 and 1A are substantially connected by a plurality of bolts 2, with the customary nut and lock washer, and a corresponding number of apertures 3 in the said members where indicated for the said bolts. Surface 4 of members 1 and 1A being of a uniform plane, and gasket 5 conforming to the said surfaces and is clamped between them when the complete housing is thereby assembled.

Throughout the drawings the connecting elements of the automobile are indicated by respective letters, while the invention proper is designated by reference numerals.

Completely enclosed within the housing is the mechanism of the device, which embodies driving gear 6, having spur teeth 7 thereupon that are spiraliformed, as indicated in Figure 1. Gear 6 is mounted upon horizontal shaft 8 by keys 9, and the said shaft journaled in bushings 10 within boss 11 of member 1, and boss 12 of member 1A, as seen in Figure 3. Felt ring 13 is retained by externally threaded ring 14, as shown in Figures 2 and 3.

Driven gear 15 is provided and is in direct mesh with gear 6, and has similar spiraliformed spur teeth as clearly indicated in Figure 1, and in Figure 6 it is seen that gear 15 has integral sleeve portions 16, and spiraliformed threads 17 extending entirely through the center opening of this complete element. Portions 16 of the said gear are journaled within respective bushings 18, and the said bushings having integral lug 19 to prevent rotatable movement of the same, and the said lug within a similarly formed recessed portion, one half of which is in each of the members 1 and 1A.

Horizontal shaft 20 is provided, and has spiraliformed threads 21 upon a portion of the same as seen in Figure 1, and which engages threads 17 of gear 15. Split bushing 22 is provided where shown and has integral lug 23, and semi-recessed portions in members 1 and 1A for the accommodation of the said lugs. Space 24 in members 1 and 1A permit horizontal movement of shaft 20, as clearly visible in Figure 1.

Shaft 20 has yoke 25 formed upon the outer end thereof to engage arm 26 by means of bolt 27 with the usual nut and lock washer for same. The opposite end of the said arm engages members 28 and 28A by bolts 29 with nut and lock washer, and the said members connected to tie rod A, as indicated in Figure 8. Ample clearance is provided for the ends of arm 26 in yoke 25 of shaft 20, and portion 29A of members 28 and 28A, in order that both of these joints will permit free oscillation of the ends of the said arm.

The device is rigidly mounted upon axle B by means of upper bracket 30 and lower bracket 31, and by referring to Figure 3 it is noted that bracket 30 is secured to boss 12 of member 1A by cap screws 32, and lock washers as shown. Bracket 31 being connected to the housing of the device by two of the bolts that are indicated by the numeral 2. It is also observed in Figure 3 that brackets 30 and 31 are respectively formed to conform to axle B. The approximate relation of the location of the device in relation to spring C is clearly indicated in Figure 4.

The details of construction of the complete device having been fully explained in the course of the preceding paragraphs, the operation of the same follows:

Shaft 8 has positive relation with the steering wheel of the vehicle by intermediate shafts and universals, or this relation may be effected by other elements, or in any approved manner.

Referring to Figure 1, the teeth upon gears 6 and 15, threads 17 of gear 15, and threads 21 of shaft 20 are all arranged in the proper relation in order that when the steering wheel is rotatably moved to actuate gear 6 in the direction of arrow D, shaft 20 will move in the direction of arrow F, thus directing the path of the vehicle wheels to the left, whereupon when the steering wheel is similarly rotated in the direction of arrow E, shaft 20 will move in the course of arrow G, and likewise direct the path of the said wheels to the right, when the tie rod A is positioned to the rear of the axle B. The normal position of the device in all the views throughout the drawings are retaining the vehicle wheels in direct parallel relation with the vehicle.

While the device may effectively become a standard unit of the vehicle, a very important advantage is that it may be readily applied to any vehicle without interference with any parts thereof, and only a slight alteration being necessary in the installation of the same.

It is now understood that when gear 15 is rotated by gear 6, and by virtue of internal threads 17 within gear 15, external threads 21 upon shaft 20 will convey the said shaft in the direction the gear 15 is being rotated. Portions 16 of gear 15 are retained in one rotatable position by bushings 18, and the said bushings formed so as to provide suitable end thrust bearings for the gear 15, and this is one of the outstanding features of the invention, in that any end play or lost motion of gear 15 is thereby positively eliminated.

In total absence of arms, ball sockets, springs, and the like, lost motion from wear in the joints of these connecting elements is completely avoided, and the entire apparatus is rendered more stabilized, and with maximum strength required, and with the ease characteristic to worm mechanism, the control of the apparatus is vastly improved and by far rendered more positive and safe.

In this invention torsion is in direct relation with axle B, whereas in the customary steering apparatus of the present time, the torsion is in relation to the frame of the vehicle, therefore maximum torsion of the said frame if subjected to uneven surfaces will not affect the relation of the normal operation of the device under the most severe circumstances.

In view of this device effecting a more safe and positive control of the steering mechanism of the vehicle, it is needless to mention the unlimited value acquired in its application to trucks, racing cars, and every branch of the design of the modern automobile.

Still another advantage of the invention, and one of no less importance than those heretofore related, and this is due to the extreme simple manner of construction embodied, it may be readily manufactured at a low cost which makes it possible to place same upon the market at a price not prohibitive consistent with all advantages derived, which is of course highly important from a commercial viewpoint.

While I have herein illustrated one precise embodiment of my invention, the same is nevertheless susceptible to certain minor changes in the details of construction, or of design, if found to become necessary during any probable further development, however in the event of any changes thus indicated, a departure from the general principle as disclosed, would be consistently avoided.

Having thus described my invention, what I claim as new is:

A steering device in combination with a housing enclosure therefor, a mechanism within the said housing comprising a spiraliformed driving gear, the said gear mounted and keyed upon a horizontal shaft that is journaled within the said housing, the said shaft connected to the steering mechanism of the vehicle through intermediate elements, a spiraliformed driven gear directly in mesh with the aforesaid driving gear, a laterally extending integral sleeve portion upon each side of the said driven gear, the said sleeve portions journaled within respective bushings, and the said bushings forming end thrust bearings for the said sleeve portions, the said bushings being stationary with the aforesaid enclosure; a horizontal shaft disposed at right angles to the first-named shaft, and having spiraliformed external threads upon a portion of the same, and the said threads to engage a similar internally threaded sleeve through the aforesaid driven gear of the device; the outer end of the last-named shaft secured to an arm, and the opposite end of the said arm secured to the tie rod of the vehicle, and both of the said joints being free to oscillate, in order that the front wheels of the vehicle may be controlled by the mechanism of the device in direct response to the action of the steering wheel of the vehicle.

In testimony whereof I hereunto affix my signature.

ROBERT A. FRONE.